US008923476B2

(12) United States Patent
Paidi et al.

(10) Patent No.: US 8,923,476 B2
(45) Date of Patent: Dec. 30, 2014

(54) ACQUISITION OF PROJECTION IMAGES FOR TOMOSYNTHESIS

(75) Inventors: Ajay Paidi, Pleasant Hill, CA (US); Jonathan Maltz, Oakland, CA (US); Ali Bani-Hashemi, Walnut Creek, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 242 days.

(21) Appl. No.: 13/369,217

(22) Filed: Feb. 8, 2012

(65) Prior Publication Data
US 2012/0201345 A1 Aug. 9, 2012

Related U.S. Application Data

(62) Division of application No. 12/573,814, filed on Oct. 5, 2009, now Pat. No. 8,254,518.

(30) Foreign Application Priority Data

Oct. 5, 2010 (WO) .................. PCT/US2010/05144

(51) Int. Cl.
*A61B 6/00* (2006.01)
*G06T 11/00* (2006.01)
(52) U.S. Cl.
CPC ......... *G06T 11/006* (2013.01); *G06T 2211/408* (2013.01); *G06T 2211/436* (2013.01)
USPC .............................................. 378/26; 378/21

(58) Field of Classification Search
USPC ...................................................... 378/21–27
See application file for complete search history.

(56) References Cited

U.S. PATENT DOCUMENTS

| 6,707,878 B2* | 3/2004 | Claus et al. ...................... 378/22 |
| 7,239,684 B2* | 7/2007 | Hara et al. ....................... 378/65 |
| 7,751,528 B2* | 7/2010 | Zhou et al. ....................... 378/37 |
| 2008/0069420 A1* | 3/2008 | Zhang et al. ................... 382/132 |
| 2009/0022264 A1* | 1/2009 | Zhou et al. ........................ 378/5 |

* cited by examiner

Primary Examiner — Hoon Song

(57) ABSTRACT

Some aspects include acquisition of a first plurality of projection images of a volume using a megavoltage x-ray source, each of the first plurality of projection images associated with a respective one of a first plurality of locations of the megavoltage x-ray source, acquisition of a second plurality of projection images of the volume using a kilovoltage x-ray source, each of the second plurality of projection images associated with a respective one of a second plurality of locations of the kilovoltage x-ray source, and performance of digital tomosynthesis reconstruction to generate a three-dimensional image of the volume based on the first plurality of projection images and the second plurality of projection images. The first axis may be perpendicular to the second axis.

8 Claims, 9 Drawing Sheets

ACQUISITION OF PROJECTION IMAGES FOR TOMOSYNTHESIS

CROSS-REFERENCE TO RELATED APPLICATION

This application is a divisional and claims benefit of priority under 35 USC 120 to pending U.S. patent application Ser. No. 12/573,814, filed Oct. 5,2009.

BACKGROUND

1. Field

The embodiments described herein relate generally to radiation-based imaging systems. More particularly, the described embodiments relate to radiation-based imaging systems used in conjunction with radiation therapy.

2. Description

A linear accelerator produces electrons or photons having particular energies. In one common application, a linear accelerator generates a radiation beam and directs the beam toward a target area of a patient. The beam is intended to destroy cells within the target area by causing ionizations within the cells or other radiation-induced cell damage.

Radiation treatment plans are intended to maximize radiation delivered to a target while minimizing radiation delivered to healthy tissue. To design a radiation treatment plan, a designer must assume that relevant portions of a patient will be in particular positions relative to a linear accelerator during delivery of the treatment radiation. The goals of maximizing target radiation and minimizing healthy tissue radiation may not be achieved if the relevant portions are not positioned in accordance with the treatment plan during delivery of the radiation. More specifically, errors in positioning the patient can cause the delivery of low radiation doses to tumors and high radiation doses to sensitive healthy tissue. The potential for misdelivery increases with increased positioning errors.

Conventional imaging systems may be used to verify patient positioning prior to and during the delivery of treatment radiation. Specifically, this verification is intended to confirm that relevant portions of a patient are positioned in accordance with a treatment plan. Some systems may generate, for example, a two-dimensional projection image of a patient portal by passing a radiation beam through the patient and receiving the exiting beam at an imaging system (e.g., a flat panel imager). Other systems produce three-dimensional megavoltage cone beam computed tomography (MV CBCT) images and/or three-dimensional kilovoltage cone beam computed tomography (kV CBCT) images of a patient volume prior to and/or during radiation delivery thereto. Recently-developed systems include linear/arc tomosynthesis and stationary tomosynthesis, which provide three-dimensional images based on fewer projection images than required by CBCT, but usually at poorer resolution.

Online Image-Guided Radiation Therapy (IGRT) refers to techniques in which a patient position is monitored in near real-time during radiation treatment and/or between treatment intervals. These techniques therefore require imaging systems which are capable of generating images quickly. Moreover, the generated images should be suitably detailed to provide accurate evaluation of the patient position. Conventional uses of the above-described techniques fail to satisfy these requirements. In particular, conventional CBCT is too slow and complex, and images generated via tomosynthesis do not exhibit suitable depth resolution.

SUMMARY

To address at least the foregoing, some embodiments provide a system, method, apparatus, and means to acquire a first plurality of projection images of a volume using a megavoltage x-ray source, each of the first plurality of projection images associated with a respective one of a first plurality of locations of the megavoltage x-ray source, acquire a second plurality of projection images of the volume using a kilovoltage x-ray source, each of the second plurality of projection images associated with a respective one of a second plurality of locations of the kilovoltage x-ray source, and perform digital tomosynthesis reconstruction to generate a three-dimensional image of the volume based on the first plurality of projection images and the second plurality of projection images.

The first plurality of locations may be evenly distributed about a first axis, the second plurality of locations are evenly distributed about a second axis, and the first axis may be perpendicular to the second axis. In some aspects, the first axis and the second axis intersect at an isocenter of a linear accelerator. The first plurality of projection images and the second plurality of projection images may be acquired contemporaneously.

According to some aspects, a first plurality of projection images of a volume are acquired using a first plurality of imaging x-ray sources, each one of the first plurality of imaging x-ray sources disposed in a fixed relation with respect to one another and to a first axis and to emit a respective imaging x-ray, and each of the first plurality of projection images associated with an imaging x-ray emitted by a respective one of the first plurality of imaging x-ray sources. A second plurality of projection images of the volume are acquired using a second plurality of imaging x-ray sources, each one of the second plurality of imaging x-ray sources disposed in a fixed relation with respect to one another and to a second axis and to emit a respective imaging x-ray, and each of the second plurality of projection images associated with an imaging x-ray emitted by a respective one of the second plurality of imaging x-ray sources. Digital tomosynthesis reconstruction is then performed to generate a three-dimensional image of the volume based on the first plurality of projection images and the second plurality of projection images. Again, the first axis may be perpendicular to the second axis, and the first axis and the second axis may intersect at an isocenter of a linear accelerator.

Some aspects may be employed to acquire a first plurality of projection images of a volume using a first x-ray source, each of the first plurality of projection images associated with a respective one of a first plurality of locations of the first x-ray source within 22.5° of a first axis, acquire a second plurality of projection images of the volume using a second x-ray source, each of the second plurality of projection images associated with a respective one of a second plurality of locations of the second x-ray source within 22.5° of a second axis, and perform digital tomosynthesis reconstruction to generate a three-dimensional image of the volume based on the first plurality of projection images, the second plurality of projection images and no other projection images.

In some aspects, the first axis is perpendicular to the second axis. The first axis and the second axis may also or alternatively intersect at an isocenter of a linear accelerator. According to some aspects, the first x-ray source comprises a megavoltage radiation source, and the second x-ray source comprises a kilovoltage radiation source. Moreover, the first plurality of projection images and the second plurality of projection images may be acquired contemporaneously.

Aspects may include a first plurality of imaging x-ray sources, each one of the first plurality of imaging x-ray sources disposed in a fixed relation with respect to one another and to a first axis and to emit a respective imaging x-ray, and a first imaging system to acquire a first plurality of projection images of a volume, each of the first plurality of projection images associated with an imaging x-ray emitted by a respective one of the first plurality of imaging x-ray sources. Also included may be a second plurality of imaging x-ray sources, each one of the second plurality of imaging x-ray sources disposed in a fixed relation with respect to one another and to a second axis and to emit a respective imaging x-ray, and a second imaging system to acquire a second plurality of projection images of the volume, each of the second plurality of projection images associated with an imaging x-ray emitted by a respective one of the second plurality of imaging x-ray sources. A processor may perform digital tomosynthesis reconstruction to generate a three-dimensional image of the volume based on the first plurality of projection images and the second plurality of projection images.

The claims are not limited to the disclosed embodiments, however, as those in the art can readily adapt the description herein to create other embodiments and applications.

BRIEF DESCRIPTION OF THE DRAWINGS

The construction and usage of embodiments will become readily apparent from consideration of the following specification as illustrated in the accompanying drawings, in which like reference numerals designate like parts, and wherein.

DETAILED DESCRIPTION

The following description is provided to enable any person in the art to make and use the described embodiments and sets forth the best mode contemplated by the inventors for carrying out the described embodiments. Various modifications, however, will remain readily apparent to those in the art.

Figure 1:
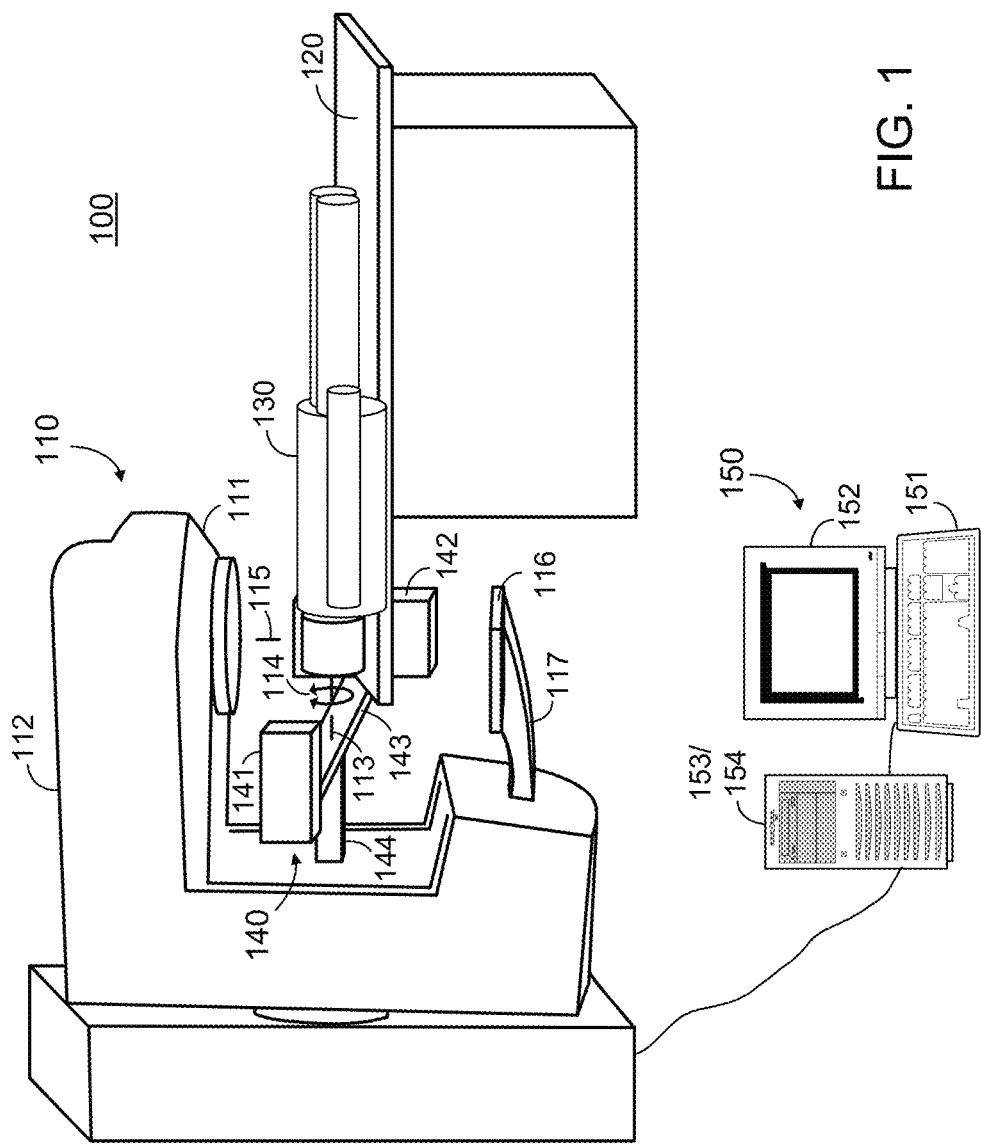
FIG. 1 is a perspective view of a radiation treatment room according to some embodiments.

FIG. 1 illustrates radiation treatment room 100 pursuant to some embodiments. Radiation treatment room 100 includes linear accelerator (linac) 110, table 120, beam object 130, imaging system 140 and operator console 150. The elements of radiation treatment room 100 may be used to deliver a treatment beam of x-rays to a target volume of beam object 130. In this regard, beam object 130 may comprise a patient positioned to receive the treatment beam according to a radiation treatment plan. The elements of treatment room 100 may be employed in other applications according to some embodiments.

Linac 110 may comprise a megavoltage radiotherapy delivery system providing kilovoltage imaging such as the ARTISTE™ system from Siemens Medical Systems, but embodiments are not limited thereto. Linac 110 generates and emits a treatment x-ray beam from treatment head 111. Treatment head 111 includes a beam-emitting device for emitting a beam during calibration, acquisition of projection images, and/or treatment. The radiation beam may comprise electron, photon or any other type of radiation. According to some embodiments, the beam exhibits energies in the megavoltage range (i.e. >1 MeV) and may therefore be referred to as a megavoltage beam.

Also included within treatment head 111 is a beam-shielding device, or collimator, for shaping the beam and for shielding sensitive surfaces from the beam. The collimator may be rotated and various elements of the collimator may be positioned according to a treatment plan. The collimator may thereby control a cross-sectional shape of the beam.

Treatment head 111 is coupled to a projection of gantry 112. Gantry 112 is rotatable around gantry axis 113 before, during and after emission of a megavoltage beam therefrom. As indicated by arrow 114, gantry 112 may rotate clockwise or counter-clockwise according to some embodiments. Rotation of gantry 112 serves to rotate treatment head 111 around axis 113.

During imaging or radiation treatment, treatment head 111 emits a divergent beam of megavoltage x-rays along beam axis 115. The beam is emitted towards an isocenter of linac 110. The isocenter is located at the intersection of beam axis 115 and gantry axis 113. Due to divergence of the beam and the shaping of the beam by the aforementioned beam-shaping devices, the beam may deliver radiation to a volume of beam object 130 rather than only through the isocenter.

Table 120 supports beam object 130 during radiation treatment. Table 120 may be adjustable to assist in positioning a treatment area of beam object 130 at the isocenter of linac 110. Table 120 may also be used to support devices used for such positioning, for calibration and/or for verification.

Imaging device 116 may comprise any system to acquire an image based on received x-rays, including but not limited to a flat panel imager. Imaging device 116 may be attached to gantry 112 in any manner, including via extendible and retractable housing 111. Rotation of gantry 112 may cause treatment head 111 and imaging device 116 to rotate around the isocenter such that the isocenter remains located between treatment head 111 and imaging device 116 during the rotation.

Imaging device 116 may acquire projection images based on radiation emitted from treatment head 111 before, during and/or after radiation treatment. For example, imaging device 116 may be used to acquire images for verification and recordation of a target volume position and of an internal patient portal to which radiation is delivered. These images may reflect the attenuative properties of objects located between treatment head 111 and imaging device 116. As will be described below, such projection images may be used to reconstruct a three-dimensional image of the objects located between treatment head 111 and imaging device 116.

Imaging system 140 includes kilovoltage x-ray source 141, imaging device 142, support 143 and extension 144. Imaging system 140 may acquire projection images of an object located between source 141 and imaging device 142. Imaging system 140 is coupled to gantry 112 via extension 144. In some embodiments, support 143 is rotatably coupled to extension to allow source 141 and device 142 to rotate about axis 113. Kilovoltage x-ray source 141 may comprise any suitable single or multi-source device to emit imaging radiation, including but not limited to a conventional x-ray tube. In some embodiments, x-ray source 141 emits kilovoltage radiation having energies ranging from 50 to 150 keV.

Operator console 150 includes input device 151 for receiving instructions from an operator such as an instruction to verify a patient position and an instruction to deliver treatment radiation according to a treatment plan. Console 150 also includes output device 152, which may be a monitor for presenting calculated projection images, acquired projection images, three-dimensional images, operational parameters of linear accelerator 110 and/or interfaces for controlling elements thereof. Input device 151 and output device 152 are coupled to processor 153 and storage 154.

Processor 153 executes program code according to some embodiments. The program code may be executable to control linear accelerator 110 to operate as described herein. The program code may be stored in storage 154, which may comprise one or more storage media of identical or different types, including but not limited to a fixed disk, a floppy disk, a CD-ROM, a DVD-ROM, a Zip™ disk, a magnetic tape, and a signal. Storage 154 may store, for example, projection images, three-dimensional images, radiation treatment plans, software applications to operate linear accelerator 110, and other data used to perform radiation treatment.

Operator console 150 may be located apart from linear accelerator 110, such as in a different room, in order to protect its operator from radiation. For example, linear accelerator 110 may be located in a heavily shielded room, such as a concrete vault, which shields the operator from radiation generated by linear accelerator 110.

Each of the devices shown in FIG. 1 may include less or more elements than those shown. In addition, embodiments are not limited to the devices shown in FIG. 1.

Figure 2:
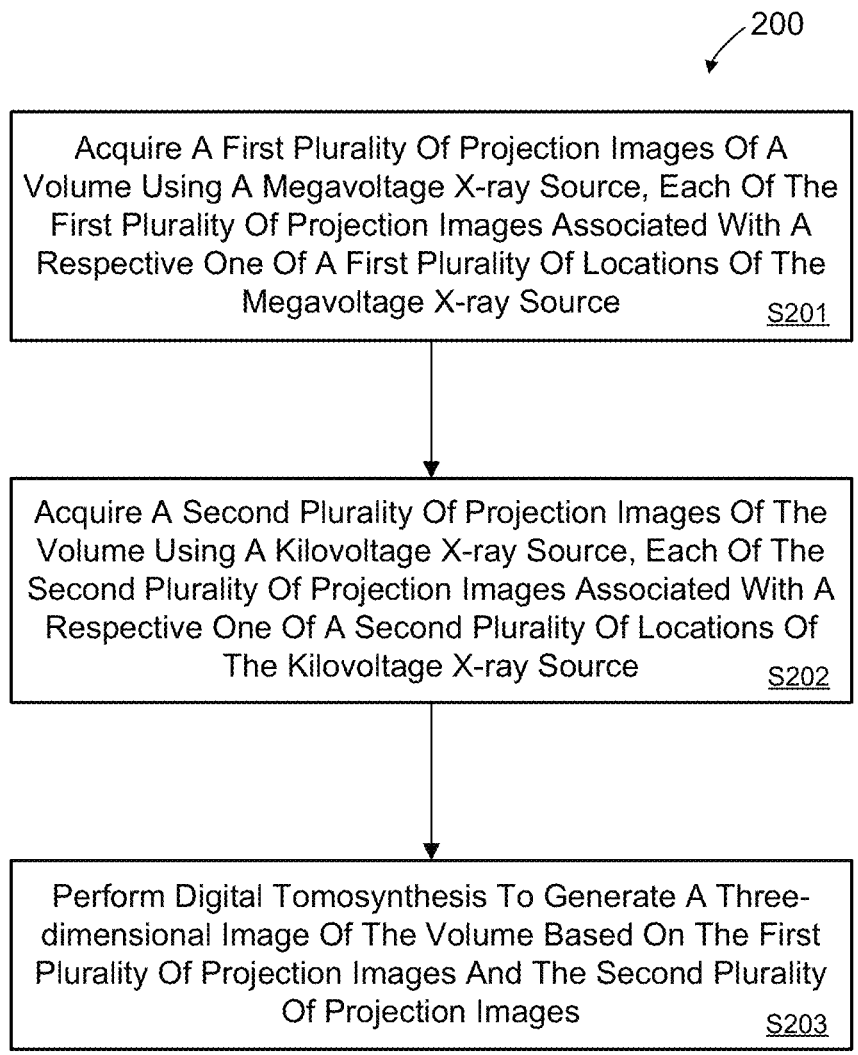
FIG. 2 comprises a flow diagram illustrating a process according to some embodiments.

FIG. 2 is a flow diagram of a process according to some embodiments. Process 200 and the other processes described herein may be performed using any suitable combination of hardware, software or manual means. Software embodying these processes may be stored by any medium, including a fixed disk, a floppy disk, a CD-ROM, a DVD-ROM, a Zip™ disk, a magnetic tape, or a signal. Examples of these processes will be described below with respect to the elements of treatment room 100, but embodiments are not limited thereto.

Process 200 may be performed at any time, including during calibration of during a radiation treatment fraction. In some embodiments, and prior to S201, an operator may manipulate input device 151 of operator console 150 to initiate operation of linear accelerator 110 to execute a radiation treatment plan. In response, processor 153 may execute program code of a system control application stored in storage 154. The operator may then operate input device 151 to initiate a patient positioning procedure requiring a three-dimensional image of a patient volume.

At S201, a first plurality of projection images of a volume is acquired using a megavoltage x-ray source. Each of the first plurality of projection images is associated with a respective one of a first plurality of locations of the megavoltage x-ray source. Similarly, at S202, a second plurality of projection images of the volume is acquired using a kilovoltage x-ray source. Each of the second plurality of projection images is associated with a respective one of a second plurality of locations of the kilovoltage x-ray source.

Figure 3A:
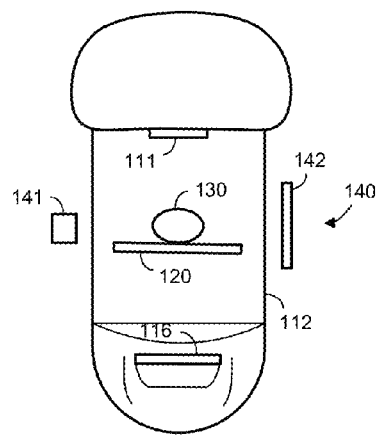
FIGS. 3A through 3C comprise front views of two imaging systems to illustrate a process according to some embodiments.
Figure 3B:
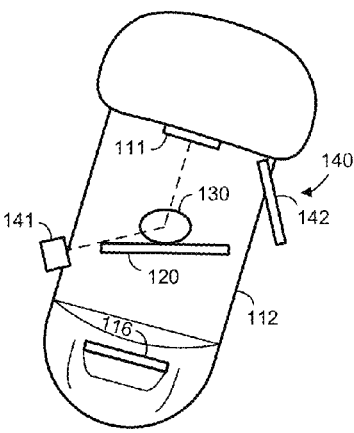
Figure 3C:
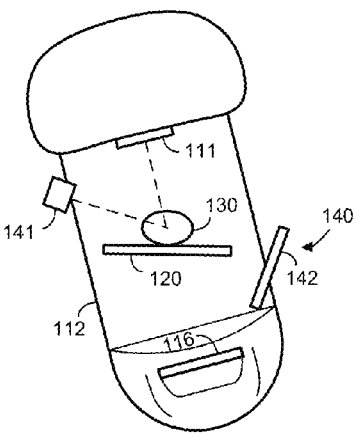

FIGS. 3A through 3C illustrate S201 and S202 according to some embodiments. According to FIGS. 3A through 3C, S201 and S202 occur contemporaneously, but embodiments are not limited thereto. FIG. 3A illustrates gantry 112 and imaging system 140 in respective "Home" positions (i.e., HomeA and HomeB, respectively) prior to S201. Embodiments are not limited to initial 0° home positions as shown.

FIG. 3B shows clockwise rotation of gantry 112 through angle $\theta_{A1}$ and counterclockwise rotation of imaging system 140 through angle $\theta_{B1}$. During this rotation, some of the first plurality of projection images are acquired by emitting radiation from x-ray source 111 and receiving the radiation (as attenuated by beam object 130) at imaging device 116. Also during the rotation, some of the second plurality of projection images are acquired by emitting radiation from x-ray source 141 and receiving the attenuated radiation at imaging device 142. Angle $\theta_{A1}$ and angle $\theta_{B1}$ may be identical or different. According to some embodiments, angle $\theta_{A1}$ and angle $\theta_{B1}$ are less than 22.5°.

FIG. 3C shows counterclockwise rotation of gantry 112 through angle $\theta_{A1}$, past the HomeA position, and through angle $\theta_{A2}$, and clockwise rotation of imaging system 140 through angle $\theta_{B1}$, past the HomeB position, and through angle $\theta_{A1}$. During this rotation, others of the first plurality of projection images and the second plurality of projection images are acquired by imaging device 116 and imaging device 142, respectively. Again, angle $\theta_{A2}$ and angle $\theta_{B2}$ may be identical or different, and may be less than 22.5°. Moreover, angle $\theta_{A1}$ and angle $\theta_{A2}$ need not be identical, and angle $\theta_{B1}$ and angle $\theta_{B2}$ need not be identical.

A total angle of rotation (e.g., $\theta_{A1}$+angle $\theta_{A2}$) of each imaging system may approach 45° to obtain a compete sampling of the volume, as will be described below. In some embodiments of process 200, one of gantry 112 and imaging system 140 may first rotate to acquire a corresponding set of projection images, followed by rotation of the other to acquire its corresponding set of projection images.

The scanning trajectories of imaging system 140 and the imaging system of treatment head 111 and imaging device 116 are orthogonal, but embodiments are not limited thereto. More specifically, each trajectory is associated with a respective central axis (i.e., HomeA and HomeB), and these axes are perpendicular to one another. The present inventors have discovered that projection images acquired using two tomosynthesis scanning trajectories at an angle from one another may result in improved three-dimensional images reconstructed therefrom.

Therefore, at S203, digital tomosynthesis is performed to generate a three-dimensional image of the volume based on the first set of projection images and the second set of projection images. According to some embodiments, only projection images which are acquired within 22.5° of a scanning trajectory's central axis are used to generate the three-dimensional image, because projection images acquired outside this angular range may not provide any additional sampling as will be described below. Various digital tomosynthesis reconstruction algorithms have been developed, which include filtered back-projection and iterative reconstruction algorithms. For example, the projection images may be filtered with a Ram-Lak filter before back-projection.

The different scanning trajectories provide more complete sampling of the volume in the Fourier domain than provided by conventional tomosynthesis systems. Such sampling may reduce artifacts in the reconstructed three-dimensional image that would otherwise result from conventional tomosynthesis systems.

Figure 4A:
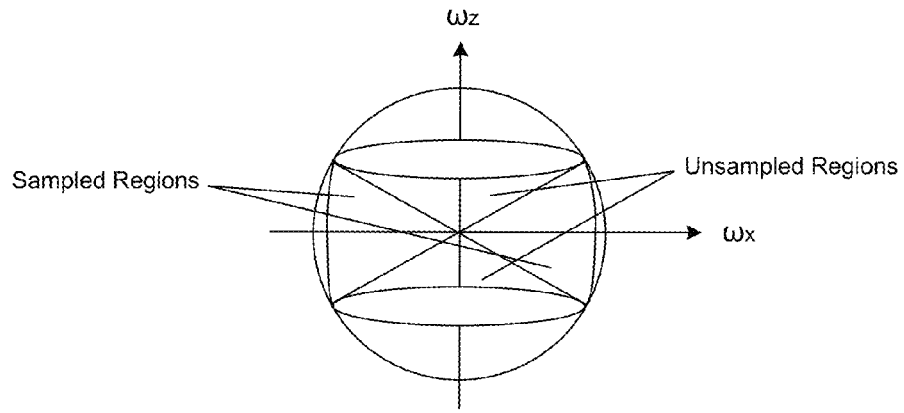
FIGS. 4A and 4B illustrate sampling in three-dimensional Fourier space.

FIG. 4A illustrates three-dimensional Fourier sampling resulting from a single circular source tomosynthesis trajectory. Circular source trajectories will be discussed below. As shown in FIG. 4A, the conical regions are not sampled by the single trajectory. A three-dimensional image reconstructed based on this incomplete sampling will likely exhibit artifacts and poor depth resolution.

Figure 4B:
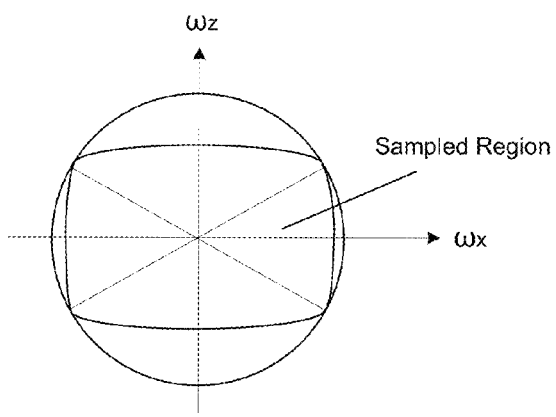

In contrast, FIG. 4B shows three-dimensional Fourier sampling resulting from circular source tomosynthesis trajectories, which in this case happen to be orthogonal and which do not deviate more than 22.5° from their central axes. As shown, the three-dimensional Fourier space is more completely sampled than in FIG. 4A, resulting in a more resolved three-dimensional reconstruction than would result from the FIG. 4A sampling.

Figure 5:
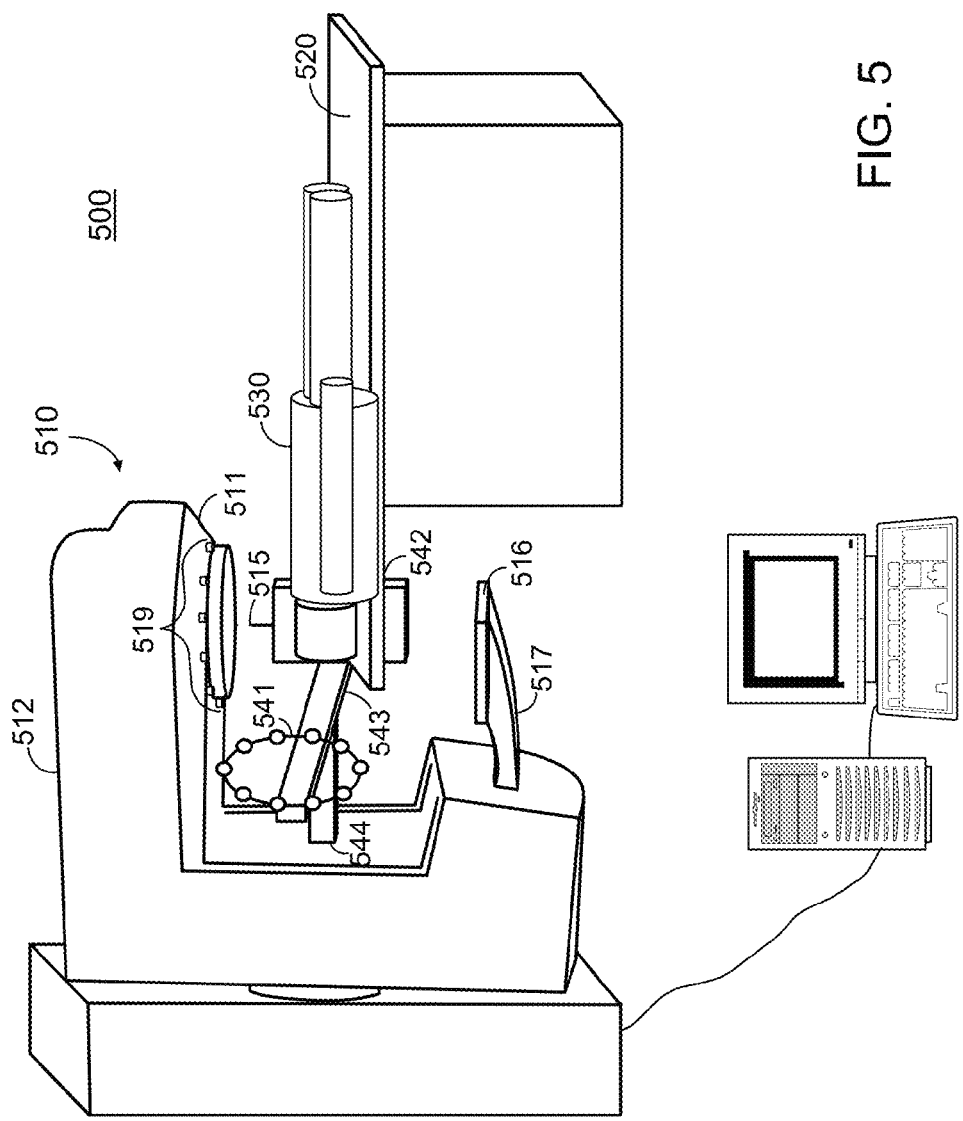
FIG. 5 is a perspective view of a radiation treatment room according to some embodiments.
Figure 6:
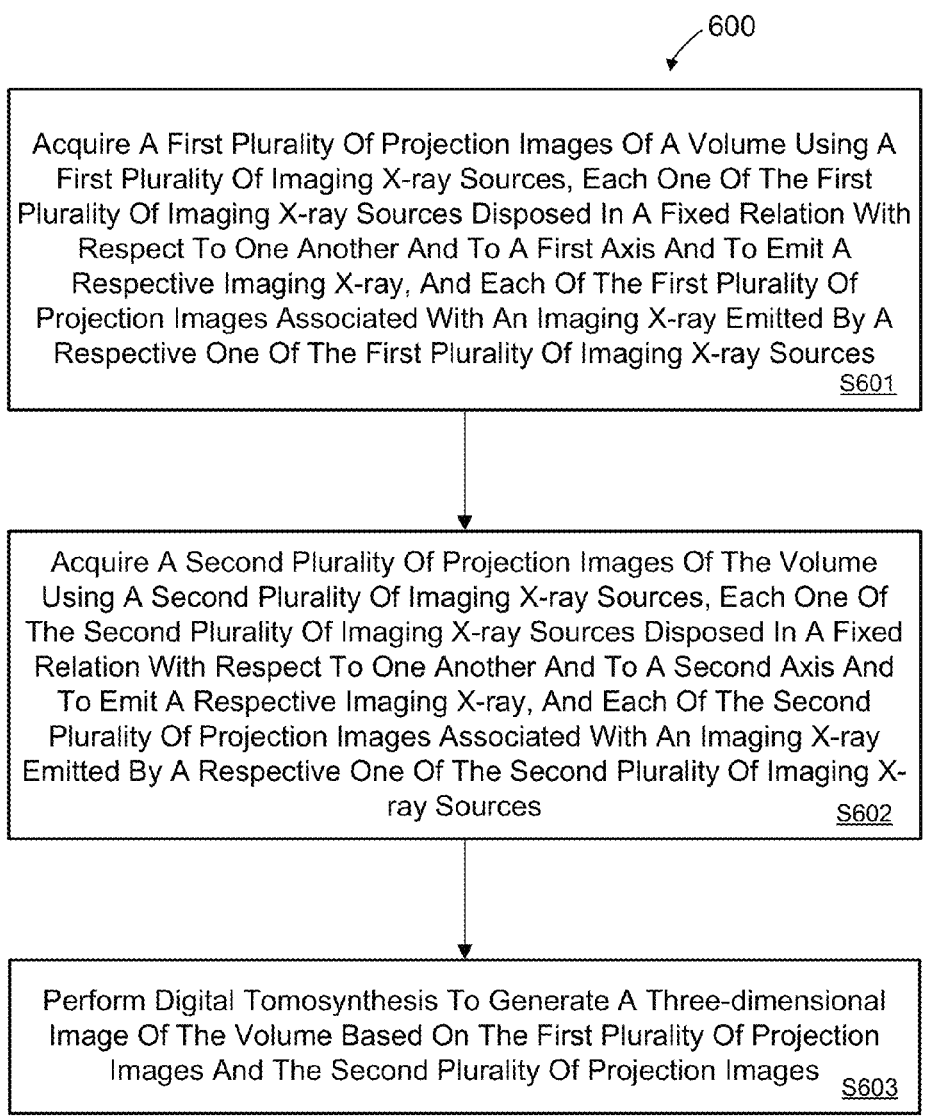
FIG. 6 comprises a flow diagram illustrating a process according to some embodiments.

Many implementations other than that shown in FIG. 1 may exhibit the foregoing advantages. FIG. 5 is a perspective view of treatment room 500 including fixed tomosynthesis x-ray sources 519 and 541.

X-ray sources 519 are disposed in a plane perpendicular to axis 515 and are arranged in a circular configuration, but embodiments are not limited thereto. In this regard, x-ray sources 519 may comprise any geometrical arrangement and operate in any manner, including those described in commonly-assigned co-pending applications (Attorney docket nos. 2007P10274US01 and 2008P00307US), and in Fixed Gantry Tomosynthesis System For Radiation Therapy Image Guidance Based On A Multiple Source X-Ray Tube With Carbon Nanotube Cathodes, Maltz et al., Med. Phys. 36 (5), May 2009, pp. 1624-1636.

X-ray sources 519 may comprise any sources known to emit kilovoltage radiation or other imaging radiation that are or become known. In some embodiments, x-ray sources 519 employ cathodes based on carbon nanotube or thermionic emission technology. X-ray sources 519 are affixed to gantry 512 such that each x-ray source 519 is disposed in a fixed relationship to each other x-ray source 519. Moreover, in some embodiments, each x-ray source 519 is disposed in a fixed relationship with respect to treatment head 511.

Imaging device 516 may be used to acquire a projection image based on radiation emitted from each one of x-ray sources 519. Each of radiation sources 519 is oriented such that radiation emitted therefrom passes through an isocenter of linear accelerator 510 and on to imaging device 516. The acquired projection images may reflect the attenuative properties of objects located between x-ray sources 519 and imaging device 516.

X-ray sources 519 exhibit a circular source trajectory. The trajectory is associated with a central axis which is identical to beam axis 515. Embodiments are not limited thereto.

Imaging system 540 is similar to imaging system 140 of FIG. 1. However, in contrast to x-ray source 141, imaging system 540 includes x-ray sources 541 arranged in a circular configuration such that each x-ray source 541 is disposed in a fixed relationship to each other x-ray source 541. X-ray sources 541 may also comprise any sources to emit kilovoltage radiation or other imaging radiation that are or become known.

Support 543 may be rotatable upon extension 544, or may be fixed such that a central axis of x-ray sources 541 remains perpendicular to a central axis of x-ray source 519 despite rotation of gantry 512. As described with respect to x-ray source 519, each of radiation sources 541 is oriented such that radiation emitted therefrom passes through the isocenter of linear accelerator 510 and to imaging device 542 to create a projection image.

Process 600 may be performed by the FIG. 5 system according to some embodiments. Initially, at S601, a first plurality of projection images of a volume are acquired using a first plurality of imaging x-ray sources. Each of the first plurality of imaging x-ray sources is disposed in a fixed relation with respect to one another and with respect to a first axis. Additionally, each of the first plurality of projection images is associated with an imaging x-ray emitted by a respective one of the first plurality of imaging x-ray sources.

Similarly, at S602, a second plurality of projection images of the volume are acquired using a second plurality of imaging x-ray sources. Each of the second plurality of imaging x-ray sources is disposed in a fixed relation with respect to one another and with respect to a second axis, and, each of the second plurality of projection images is associated with an imaging x-ray emitted by a respective one of the second plurality of imaging x-ray sources.

Figure 7:
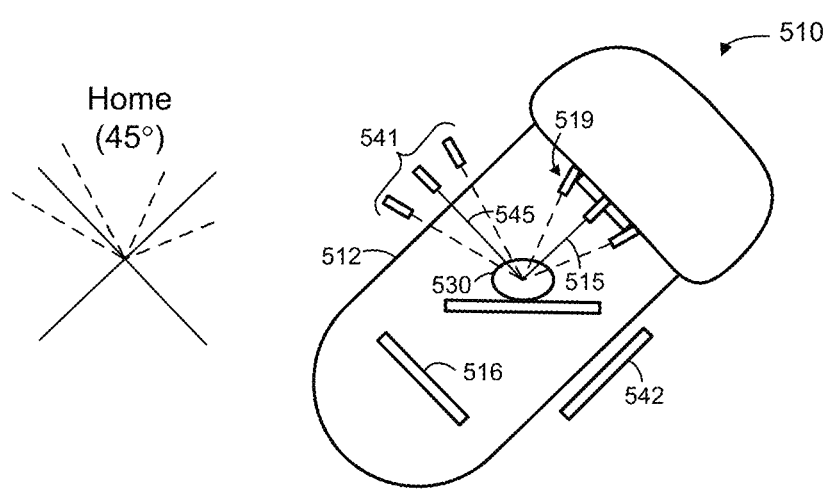
FIG. 7 comprises a front view of two imaging systems to illustrate a process according to some embodiments.

FIG. 7 is a front perspective view of linear accelerator 510 for purposes of describing an example of S601 and S602. Gantry 512 is rotated to a 45° position, but process 600 may be performed with gantry 512 at any position. Central axes 515 and 545 of sources 519 and 541, respectively, are perpendicular to one another, but embodiments are not limited thereto.

At S601, imaging device 516 acquires a projection image of object 130 corresponding to each one of sources 519. For example, each of sources 519 may emit radiation in succession and imaging device 516 may acquire a projection image based on each emission. In some embodiments, more than one of sources 519 emits radiation simultaneously, imaging device 516 receives the radiation, and known techniques are applied to generate a separate projection image corresponding to the radiation emitted by each of the more than one sources.

Imaging device 542 acquires a projection image corresponding to each one of sources 541 at S602. Again, each of sources 541 may emit radiation separately and imaging device 542 may acquire a projection image based on each separate emission. S601 and S602 may be performed substantially simultaneously (or contemporaneously if several steps are involved) in order to reduce the time required for projection image acquisition.

Digital tomosynthesis is performed on the acquired projection images at S603 to generate a three-dimensional image of the volume. As described with respect to FIG. 4B, the three-dimensional image may be more useful than those acquired using previous techniques due to more complete sampling of the Fourier space.

Figure 8:
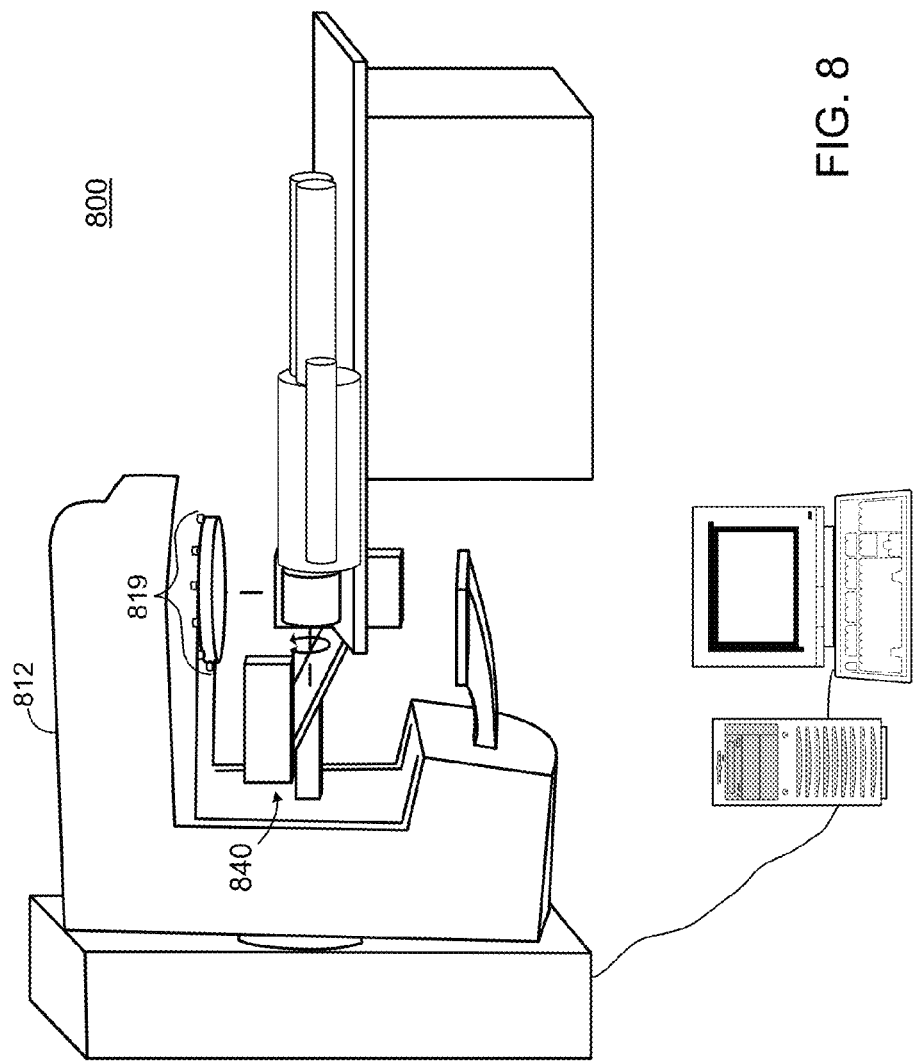
FIG. 8 is a perspective view of a radiation treatment room according to some embodiments.

Some embodiments may employ any suitable combinations of the above-described scanning trajectories. FIG. 8 Illustrates treatment room 800 including sources 819 to provide projection images along a fixed circular scanning trajectory as described with respect to sources 819. Treatment room 800 also includes imaging system 840 to provide projection images along a linear arc scanning trajectory.

According to some embodiments, a three-dimensional image is generated based on a first set of projection images acquired using sources 819 and on a first set of projection images acquired using imaging system 840. According to some embodiments, the second set of projection images is limited to only those projection images acquired within 22.5° of a central axis of the linear arc scanning trajectory of imaging system 840.

FIG. 8 Illustrates treatment room 800 including sources 819 to provide projection images along a fixed circular scanning trajectory as described with respect to sources 819. Treatment room 800 also includes imaging system 840 similar to imaging system 140 to provide projection images along a linear arc scanning trajectory. The central axes of these scanning trajectories may be perpendicular to one another (or in another relationship) regardless of a position of gantry 812.

According to some embodiments, a three-dimensional image is generated based on a first set of projection images acquired using sources 819 and on a first set of projection images acquired using imaging system 840. According to some embodiments, the second set of projection images is limited to only those projection images acquired within 22.5° of a central axis of the linear arc scanning trajectory of imaging system 840.

Figure 9:
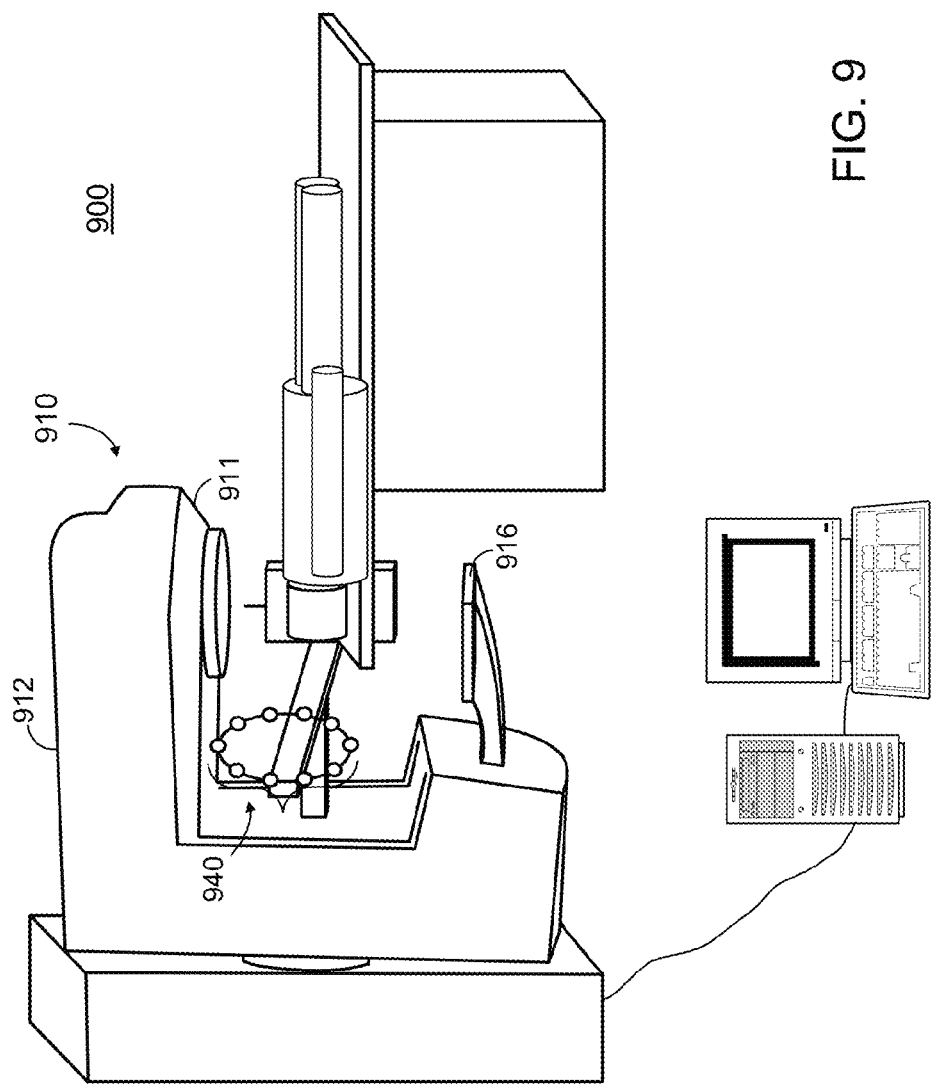
FIG. 9 is a perspective view of a radiation treatment room according to some embodiments.

FIG. 9 Illustrates treatment room 900 including treatment head 911 and imaging device 916 to provide projection images along a linear arc scanning trajectory as described with respect to treatment head 111 and imaging device 116. Imaging system 940, on the other hand, is to provide projection images along a fixed circular scanning trajectory as described with respect to imaging system 540. The central axes of these scanning trajectories may be perpendicular to one another or may exhibit any other desired relationship regardless of a position of gantry 912.

As noted above, acquisition of a first set of projection images and a second set of projection images according to any embodiment may occur successively, simultaneously, or with any degree of overlap. In addition to the above-described implementations, any employed imaging system may be physically independent from other devices to any degree. That is, embodiments contemplate the use of one or more standalone C-arm imaging systems, one or more standalone rings of fixed digital tomosynthesis sources, standalone flat panel imagers, etc.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:
    acquiring a first plurality of projection images of a volume using a first plurality of imaging x-ray sources, each one of the first plurality of imaging x-ray sources disposed in a fixed relation with respect to one another and to a first axis and to emit a respective imaging x-ray, each of the first plurality of projection images being associated with an imaging x-ray emitted by a respective one of the first plurality of imaging x-ray sources in a first scanning trajectory;
    acquiring a second plurality of projection images of the volume using a second plurality of imaging x-ray sources, each one of the second plurality of imaging x-ray sources disposed in a fixed relation with respect to one another and to a second axis and to emit a respective imaging x-ray, each of the second plurality of projection images being associated with an imaging x-ray emitted by a respective one of the second plurality of imaging x-ray sources in a second scanning trajectory, wherein the first scanning trajectory and the second scanning trajectory are different from each other, wherein the first scanning trajectory and the second scanning trajectory are selected from at least one of a circular source scanning trajectory and a linear arc scanning trajectory, and wherein the plurality of x-ray sources associated with the linear arc scanning trajectory rotate in the scanning trajectory; and
    performing digital tomosynthesis reconstruction to generate a three-dimensional image of the volume based on the first plurality of projection images and the second plurality of projection images.

2. A method according to claim 1,
    wherein the first axis is perpendicular to the second axis.

3. A method according to claim 2,
    wherein the first axis and the second axis intersect at an isocenter of a linear accelerator.

4. A method according to claim 1,
    wherein the first plurality of projection images and the second plurality of projection images are acquired substantially simultaneously.

5. An apparatus comprising:
    a first plurality of imaging x-ray sources, each one of the first plurality of imaging x-ray sources disposed in a fixed relation with respect to one another and to a first axis and to emit a respective imaging x-ray;
    a first imaging device to acquire a first plurality of projection images of a volume, each of the first plurality of projection images associated with an imaging x-ray emitted by a respective one of the first plurality of imaging x-ray sources in a first scanning trajectory;
    a second plurality of imaging x-ray sources, each one of the second plurality of imaging x-ray sources disposed in a fixed relation with respect to one another and to a second axis and to emit a respective imaging x-ray;
    a second imaging device to acquire a second plurality of projection images of the volume, each of the second plurality of projection images associated with an imaging x-ray emitted by a respective one of the second plurality of imaging x-ray sources in a second scanning trajectory, wherein the first scanning trajectory and the second scanning trajectory are different from each other, wherein the first scanning trajectory and the second scanning trajectory are selected from at least one of a circular source scanning trajectory and a linear arc scanning trajectory, and wherein the plurality of x-ray sources associated with the linear arc scanning trajectory rotate in the scanning trajectory; and
    a processor to perform digital tomosynthesis reconstruction to generate a three-dimensional image of the volume based on the first plurality of projection images and the second plurality of projection images.

6. An apparatus according to claim 5, further comprising:
    a linear accelerator,
    wherein the first axis and the second axis intersect at an isocenter of the linear accelerator.

7. An apparatus according to claim 6,
    wherein the first axis is perpendicular to the second axis.

8. An apparatus according to claim 5,
    wherein acquisition of the first plurality of projection images and the second plurality of projection images is to occur substantially simultaneously.

* * * * *